United States Patent Office 3,418,871
Patented Dec. 31, 1968

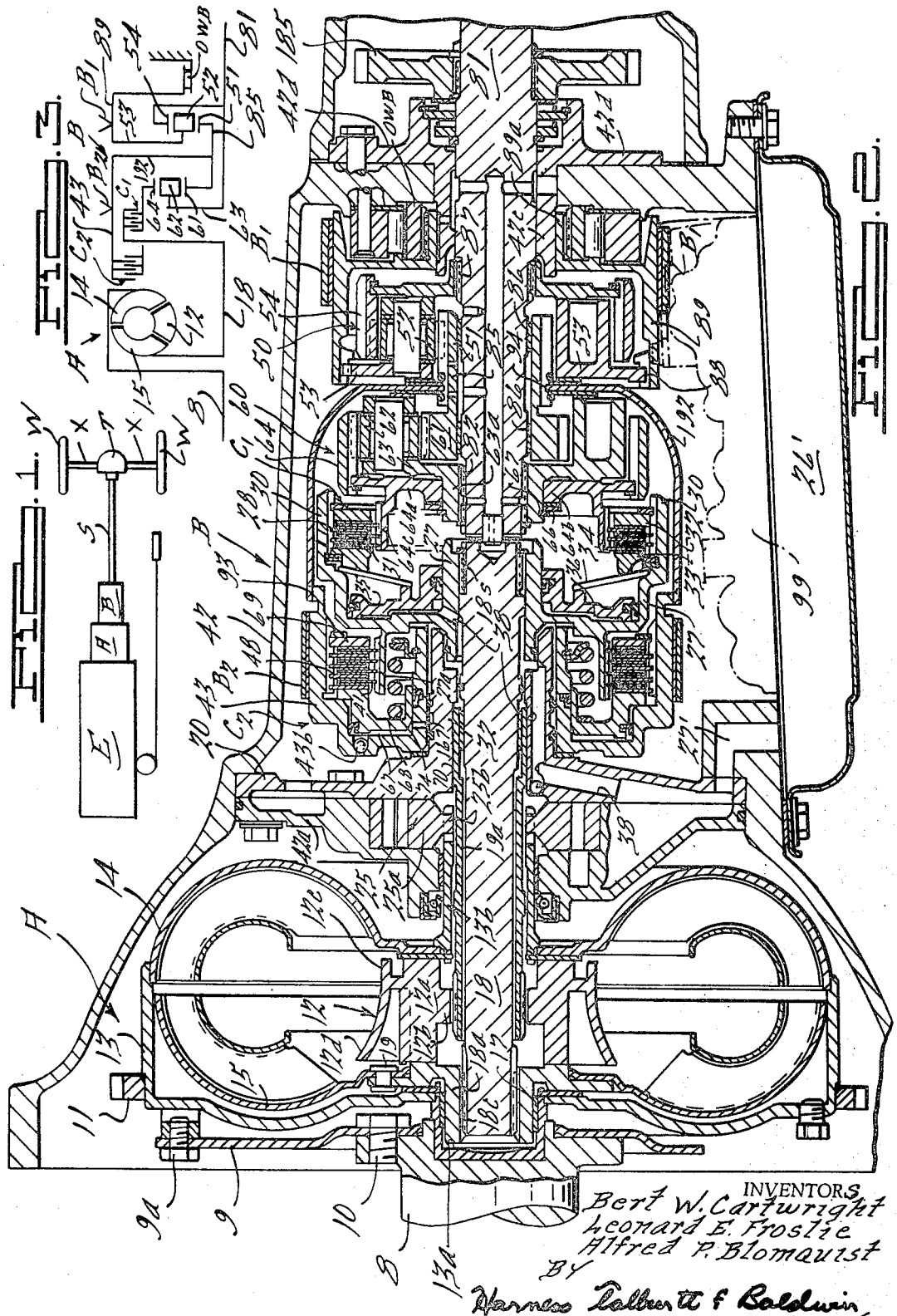

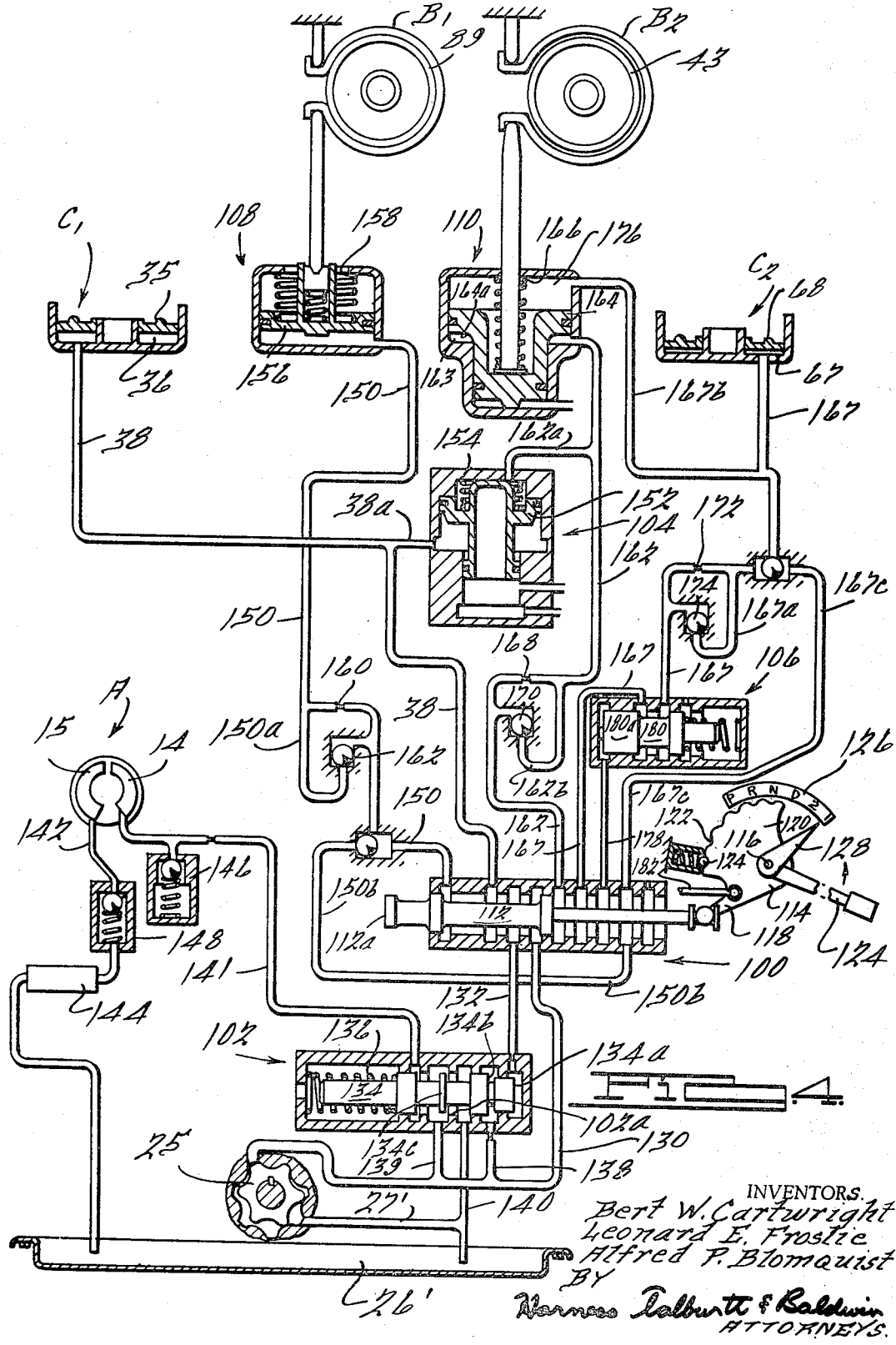

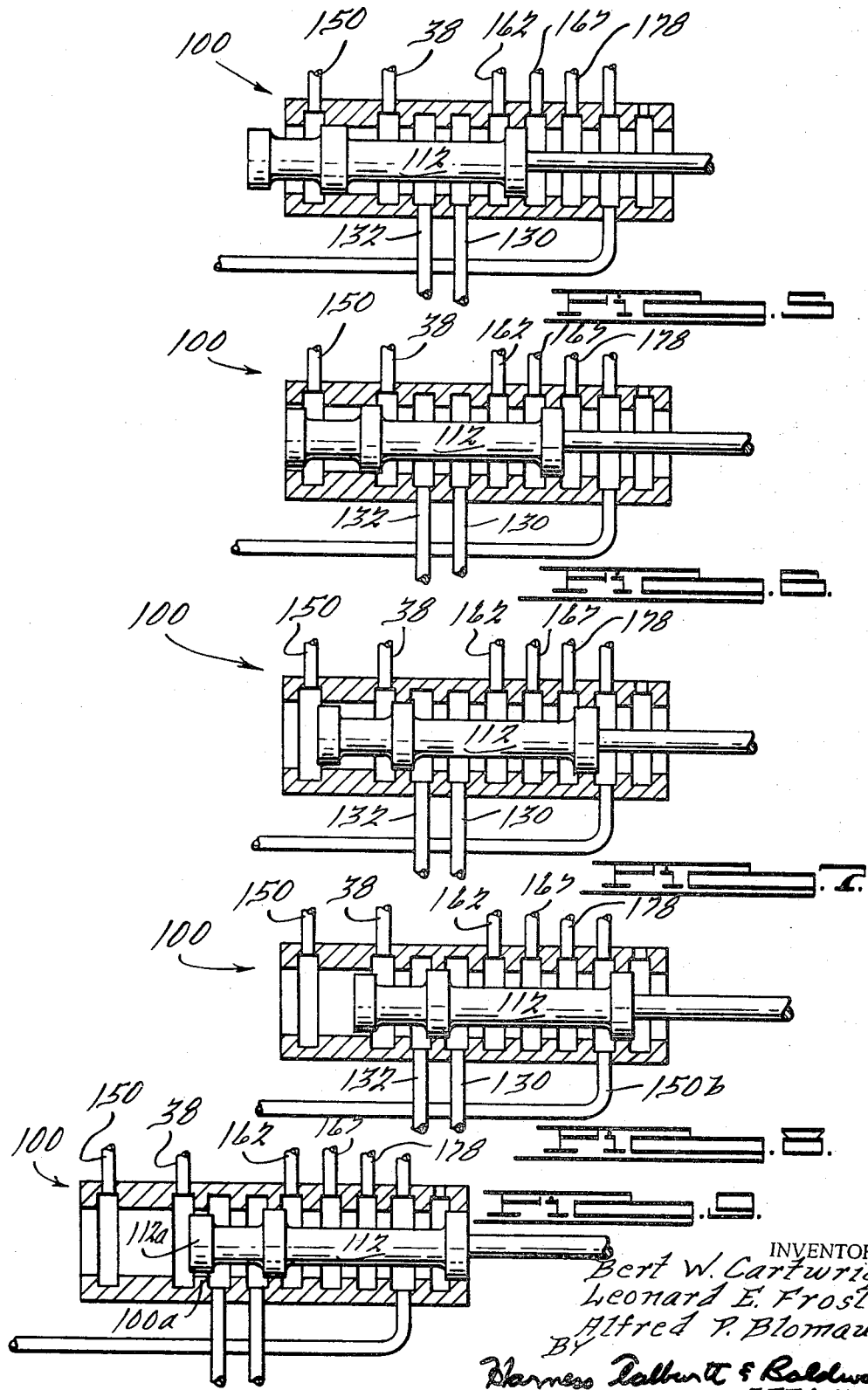

3,418,871
TRANSMISSION FOR MOTOR VEHICLE
Bert W. Cartwright, St. Clair Shores, Leonard E. Froslie, Detroit, and Alfred P. Blomquist, Farmington, Mich., assignors to Chrysler Corporation, Highland Park, Mich., a corporation of Delaware
Filed Nov. 21, 1966, Ser. No. 595,717
2 Claims. (Cl. 74—763)

ABSTRACT OF THE DISCLOSURE

A planetary power transmission for motor vehicles in which the gear sets are driven from the engine through a simple fluid coupling and shifting of the gears between their several combining patterns is selectively accomplished by manual shifting of the operator selector lever.

---

This invention relates to transmissions for motor vehicles. More particularly, it relates to a transmission of the semiautomatic type in which the gears as shifted by manipulation of a gear selector lever without resort to the manual clutch.

It is an object of the present invention to provide an improved transmission for a motor vehicle.

Another object is to provide an improved motor vehicle transmission of the semi-automatic type.

A further object is to provide a motor vehicle transmission of the semi-automatic type offering better performance characteristics than prior units of the semi-automatic type.

A more specific object of the present invention is to provide a motor vehicle transmission of the semi-automatic type which may be manufactured at a cost comparable to, or less than, the cost of a completely manual transmission.

The transmission of the invention includes an input shaft, an output shaft, and a gear train selectively interconnecting the input and output shafts and having a plurality of gears having a series of combining patterns effective to provide a series of drive ratios between the input and output shafts. According to an important feature of the invention, power clutch means are provided which are operable when actuated to selectively shift the transmission gears between their various patterns, and control means are provided which are operative in response to selective movement of the vehicle gear selector lever between its several drive positions to selectively actuate the power clutch means and thereby selectively shift the transmission gears between their several combining patterns.

These and other objects, features and advantages of the invention will be apparent from the following detailed description of a preferred embodiment of the invention and from the accompanying drawings wherein:

FIG. 1 is a schematic view of a motor vehicle drive train that includes a transmission embodying this invention;

FIG. 2 is a sectional elevational view of the transmission utilized in the drive train of FIG. 1;

FIG. 3 is a schematic line diagram of the transmission shown in FIG. 2; and

FIGS. 4–9 are schematic views of the control system for the transmission of the invention.

FIG. 1 of the drawings diagrammatically discloses a motor vehicle power plant and drive train comprising an internal combustion engine E drivingly connected to a transmission unit that consists of a fluid coupling A drivingly connected to a change speed gear box B. The output from gear box B drives a propeller shaft or drive shaft S that transmits drive through a differential unit T and axles X to the rear driving wheels W of the vehicle.

FIG. 2 of the drawings shows fluid coupling A and change speed gear box B arranged in a series connected, drive transmitting relationship. The reference numeral 8 represents an end portion of a driving member, such as the crankshaft of the engine E of the motor vehicle power plant. The shaft 8 is drivingly connected to a drive transmitting ring 9 by the screw means 10. The drive transmitting ring 9 is drivingly connected by bolts 9a to a fluid coupling casing 13. Casing 13 has an engine starter ring gear 11 mounted on and extending about its periphery.

A vaned impeller wheel 14 is formed as an integral part of the converter casing 13 so as to be rotatably driven by the driving shaft 8. A vaned turbine wheel 15 is a drivingly connected by rivet means 19 to a radially extending flange portion formed on the shaft hub member 18a of a shaft 18. A ring member 12 is positioned between the axially spaced radially inner edges of wheels 14 and 15. Ring member 12 includes a main body portion 12a, a radially inner rib portion 12b, and a radially outer flange portion 12c presenting at its radially outer face an arcuate annular surface 12d. Shaft hub member 18a is drivingly connected by splines 18c to the forward end portion of shaft member 18.

Shaft 18 is adapted to transmit drive from the turbine member 15 of fluid coupling A to the planetary gearing of the gear box unit B arranged rearwardly of and in series with fluid coupling A. Shaft 18 thus constitutes the input shaft to the gear box B. The forward end of shaft 18 is journaled in a bearing 17 piloted in an axially extending seat 13a formed in the hub of casing 13. The rear end portion of shaft 18 is journaled within hub portion 32 of a support plate 20 bolted to the front wall 42a of the gear box housing 42.

Ring member 12 is fixedly positioned within casing 13 by the splined engagement of rib portion 12b with the forward end of an axially extending hollow sleeve 19a splined to hub portion 32 of support plate 20 at 70.

Fluid coupling A includes a gear type oil pump 25 having a driving gear 25a that is directly connected by key means 25b to the rearwardly projecting end of an axially extending, sleeve-like flange portion 13b of casing 13. The pump 25 draws oil from a supply sump 26' through supply conduit 27' and circulates this oil through coupling A, the transmission unit lubricating system, and the various hydraulically operated control mechanisms associated with the transmission unit.

The gear box B includes a forward drive clutch $C_1$, a direct drive clutch $C_2$, a pair of brake bands $B_1$ and $B_2$, a one-way brake (O.W.B.), and a gear train including a pair of planetary gear sets 50 and 60 adapted to cooperate with the fluid coupling A to provide means for the transmission of three forward drives and a reverse drive to the propeller shaft S. The forward drive clutch $C_1$ is engaged whenever any of the three forward speeds is being utilized and is disengaged when the transmission controls are set for either Neutral or Reverse. The direct drive clutch $C_2$ is engaged only when the 3rd or Direct forward speed is being transmitted or when Reverse drive is being transmitted. The different clutches and brakes that are applied for transmitting the several drive ratios obtainable with this transmission are set forth in the chart below.

| Drive ratio: | Members applied |
|---|---|
| Low (1st) | $C_1$ and $B_1$ or O.W.B.$_1$. |
| Kickdown (2nd) | $C_1$ and $B_2$. |
| Direct (3rd) | $C_1$ and $C_2$. |
| Reverse | $C_2$ and $B_1$. |

The clutches $C_1$ and $C_2$ are located in the forward portion of the housing 42 and the two planetary gear sets 50 and 60 are located in the rearward portion of the housing. The rear end of input shaft 18 may or may not pilot the forward end of the gear box output shaft 81, although such a connection is not shown in the disclosed form of this invention. Output shaft 81 has its rear end portion journaled in the sleeve portion 42c of the transmission housing rear wall 42d.

Transmission input shaft 18 is drivingly connected at $18_s$ to a spider element 27. The spider element 27 includes a forwardly extending flange portion 27a carrying the friction clutch disc elements 41 of the reverse and direct drive clutch $C_2$. Clutch discs 41 are adapted to be drivingly engaged with clutch discs 48 carried on the inner cylindrical surface of a brake drum 43. Brake drum 43 is journaled on hub 32 of support plate 20.

Brake band $B_2$ is arranged to be selectively applied to the brake drum 43 to prevent rotation thereof. Brake drum 43 mounts a backing plate 69 that cooperates with an axially shiftable piston 68 to effect drive transmitting engagement of the clutch discs 41, 48. A spring 74 normally urges the piston 68 forwardly to clutch disengaged position. Brake drum 43 may include a ball check pressure fluid bleed valve 43b that is speed responsive and arranged to prevent unintended engagement of the clutch $C_2$ by the centrifugal action of any fluid that may be trapped in the piston bore 67. Pressure fluid for operation of the clutch $C_2$ is supplied to the piston bore 67 through a conduit 167.

Spider 27 also includes a rearwardly extending portion in the form of a clutch drum 30. Friction clutch discs 28 are drivingly and shiftably mounted on the inner cylindrical surface face of clutch drum 30. Clutch discs 28 are arranged to be drivingly engaged with clutch discs 31 carried by an axially extending projection 64c of a gear 64 forming the annulus gear of the forwardly located planetary gear set 60. Clutch discs 28 and 31 are arranged to be drivingly compressed against a backing plate 32 by a pressure plate 33 actuated by a lever spring plate 34. Lever spring plate 34 is operated by a piston 35 that reciprocates in a cylinder bore 36 formed in the rear side of spider 27. Pressure fluid is supplied to the cylinder bore 36 by way of a conduit 38.

The forwardly located planetary gear set 60 is arranged axially adjacent the forward drive clutch $C_1$. Gear set 60 comprises annulus gear 64, a sun gear 61, a planet pinion gearing 62 connecting gears 61, 64, and a planet pinion gear carrier 63 rotatably supporting the pinion gearing. Pinion gearing carrier 63 is splined to the output shaft 81 at 82. Annulus gear 64 is supported through its radially extending plate portion 64a on the hub 63a of the planet pinion gear carrier 63. The forward end of the hub portion 64b of the annulus gear 64 can react against the rear end of a bearing ring 66 that is anchored to the pinion gear carrier hub 63a by the snap ring 67. This connection 67 prevents the transmission of thrust forces from gearing 60 to the input shaft 18 or the clutches $C_1$ and $C_2$. The sun gear 61 is an integral part of the double sun gear sleeve 85. Sleeve 85 has the sun gear 61 formed on the front end thereof and the sun gear 51 of rearward planetary gear set 50 formed on the rear end thereof. Sun gear sleeve 85 is journaled on the output shaft 81 by means of sleeve bearings 86.

The rearwardly located gear set 50 includes sun gear 51, an annulus gear 54, a planet pinion gearing 52 connecting gears 51, 54, and a planet pinion gear carrier 53 rotatably supporting the pinion gearing 52. Annulus gear 54 is drivingly connected to the output shaft 81 by the splines 87. The spline connection 87 prevents the transmission of rearwardly directed, axial thrust forces from gearing 50 to housing rear wall sleeve portion 42c. Pinion gear carrier 53 is drivingly connected at 88 to a brake drum 89 adapted to be engaged by the brake band $B_1$. Brake drum 89 has a hub portion 89a journaled on sleeve portion 42c. Hub portion 89a of brake drum 89 is restrained against reverse rotation (counterclockwise when looking from the front towards the rear of the transmission) by means of the one-way brake device (O.W.B.) which may be a roller, sprag, or similar type of one-way device.

Interconnection between the two axially spaced adjacent gear sets 50, 60 is by way of the common sun gear sleeve 85 and by way of the dual connections of the front carrier 63 and the rear annulus gear 54 to the common output shaft 81.

A drum connector 192 is connected between the front brake drum 43 and the sun gear sleeve 85. Connector drum 192 is connected to the drum 43 at 93 and to the sun gear sleeve 85 at 94. Drum connector 192 anchors integral sun gears 51, 61 against rotation when brake band $B_2$ is applied to brake drum 43.

Mounted on the rear end of the output shaft 81 is a sprag gear 185 adapted to be engaged by a parking sprag (not shown).

A valve body 99, including the several fluid control mechanisms for the transmission, is mounted in the transmission housing oil sump 26'.

The control system for the transmission is shown schematically in FIGS. 4–9.

The control system, broadly considered, includes a main control valve 100, a pressure regulator valve 102, an accumulator 104, an auxiliary valve 106, a first servo mechanism 108 controlling brake band $B_1$, and a second servo mechanism 110 controlling brake band $B_2$. Valves 100, 102 and 106 are formed within valve body 99 while the housings of accumulator 104 and servos 108 and 110 may be formed integral with transmission housing 42.

The spool 112 of main control valve 100 is slidable axially within the valve body by pivotal movement of a control plate or lever 114 pivoted at 116 within transmission casing 42. One arm 118 of lever 114 slidably engages the free end of spool 112 while another arm 120 is provided with serrations 122 for selective engagement with a spring biased detent ball 124. Control plate 114 is pivoted by selective movement of a gear selector lever 124 seen diagrammatically in FIG. 4. Although for purposes of simplicity gear selector lever 124 is shown in FIG. 4 as being directly coupled to the pivot shaft 116 of control plate 114, it will be understood that in actual practice the gear selector lever 124 will be mounted within the passenger compartment of the motor vehicle in a position convenient to an operator of the vehicle (e.g. on the steering column or on a console between front bucket seats) and will be operatively connected to control plate 114 by a linkage system (not shown). A quadrant 126 coacts with a pointer 128 movable with gear selector lever 124 to provide a visual indication of the position of valve spool 112.

When gear selector lever 124 is moved to a position to dispose pointer 128 opposite the indicium "1" on quadrant 126, the transmission is conditioned for operation in "LOW" gear. The action and positioning of the various valves and clutches to achieve the "LOW" condition of the transmission is seen in FIG. 4.

With spool 112 in its "LOW" position, pump 25 draws fluid from transmission casing sump 26' through line 27' and supplies fluid under pressure through line 130 to the pressurized interior of valve 100 from where it passes through line 132 to act against the right face 134a of spool 134 of valve 102 against the resistance of valve spring 136. Pressure fluid also passes from pump 25 through line 138 to act against annular face 134b of spool 134. The combined action of the pressurized fluid acting against faces 134a and 134b urges spool 134 to the left against the resistance of spring 136; when the line pressure exceeds a predetermined value, spool land 134c is moved out of sealing relationship with respect to valve body rib 102a to allow fluid to pass through line 139 and throttle betwen land 134c and rib 102c for return through line 140 to sump 26'. Regulator valve 102 thus functions to maintain the line pressure of the control system at the predetermined value, e.g. 90 p.s.i.

Fluid from line 139 also passes through the interior of valve 102 and then through line 141 to impeller 14 of fluid coupling A, from where it passes to turbine wheel 15 and thence through line 142 to a transmission fluid cooler 144 of usual form; from cooler 144, the fluid is directed to the gear sets 50 and 60 where it serves as a lubricant, whereafter it drains to sump 26'. A safety valve 146 in line 141 prevents build-up of excess fluid pressure and a check valve 148 in line 142 precludes back-up of fluid into fluid coupling A.

The pressurized fluid supplied to the valve interior through line 130 passes through line 38 to clutch $C_1$ and through line 150 to servo mechanism 108. The fluid delivered to clutch $C_1$ acts within pressure chamber 36 to force piston 35 outwardly and engage the clutch. Fluid from line 38 is also delivered through line 38a to accumulator 104 where it acts against piston 152 to force it upwardly against the resistance of spring 154, the accumulator thus serving to cushion the application of clutch $C_1$. The fluid delivered to servo mechanism 108 through line 150 acts to force servo piston 156 outwardly against spring 158 to close up brake band $B_1$ and cause it to firmly clamp brake drum 89.

The rate of fluid flow through line 150 is controlled by an orifice plate 160 which acts to cushion the application of servo 108. Line 150 also includes an auxiliary portion 150a by-passing orifice plate 160 to allow relatively rapid flow of fluid out of servo 108 when the latter is deactuated. A check valve 162 precludes flow of fluid through portion 150a during application of the servo. Clutch $C_2$ and servo mechanism 110 controlling brake band $B_2$ are not actuated at this time.

Application of clutch $C_1$ transmits drive to the gear box planetary input gear 64. Ring gear 64 acts on the planet pinion gears 62 and causes rotation of the sun gear 61 backwards since the load on the output shaft 81 tends to anchor the planet pinion carrier 63 against rotation. Rotation of sun gear 61 backwards rotates the sun gear sleeve 85 and the other sun gear 51 backwards. The sun gear 51 rotating backwards acts on the planet pinions 52 and tends to rotate the pinion gear carrier 53 backwards because of the output shaft load on the ring gear 54. Since brake band $B_1$ is applied, the carrier 53 cannot be rotated backwards and the pinion gears 52 are then active to drive the ring gear 54 and connected output shaft 81 forwardly. Due to the connection of both the carrier 63 and the ring gear 54 to the output shaft 81 and due to the anchoring of carrier 53 by brake band $B_1$, part of the torque of the input shaft 18 is transmitted directly to the output shaft 81 by the planetary gear set 60 and the other part of the input shaft torque is delivered to the output shaft 81 through the compounded gear sets 50 and 60.

When gear selector lever 124 is moved to a position to dispose pointer 128 opposite the indicium "2" on the quadrant 126, the transmission is conditioned for operation in "SECOND" gear. The position of the valve spool 112 of main control valve 100 at this time is shown in FIG. 5.

With spool 112 in its "SECOND" position, regulator valve 102 functions in the manner previously described with reference to operation of the transmission in "LOW" gear to maintain line pressure at approximately 90 p.s.i., and the fluid passing through fluid coupling A is continuously circulated and cooled as previously described. The pressurized fluid supplied to the interior of valve 100 through line 130 passes through line 38 to engage clutch $C_1$ and through line 162 to servo 110 where it acts in lower piston chamber 163 to force servo piston 164 outwardly against spring 166 to close up brake band $B_2$ and cause it to firmly clamp brake drum 43. Fluid from line 162 is also delivered through line 162a to the upper end of accumulator 104 where it acts in combination with spring 154 to force accumulator piston 152 downwardly against the resistance of the pressure fluid from line 38a acting against the lower face of piston 152. Accumulator 104 functions in this instance to cushion the application of both clutch $C_1$ and servo 110. Application of servo 110 is further cushioned by an orifice plate 168 in line 162. Line 162 also includes an auxiliary portion 162b by-passing orifice 160 to allow relatively rapid flow of fluid out of servo 110 when the latter is deactuated. A check valve 170 precludes flow of fluid through portion 162b during application of the servo. Cutch $C_2$ and servo 108 are not actuated at this time.

With clutch $C_1$ and braking band $B_2$ applied, planetary input gear 64 is driven as in the case of LOW gear operation, but the rotatable sleeve 85 that carries the sun gears 51 and 61 is now anchored against rotation by virtue of its rigid connection with brake drum 43 through connector drum 192. With sun gear 61 anchored, the planetary gear set 60 is activated to directly transmit a two-way forward second speed drive from ring gear 64 to pinions 62 to the output shaft 81 by way of the carrier 63. Planetary gear set 50 is inactive at this time and its pinion gear carrier 53 is driven forwardly at a speed which causes it to lift off and to overrun the one-way brake device O.W.B.

When gear selector lever 124 is moved to a position to dispose pointer 124 opposite the indicium "D" on quadrant 126, the transmission is conditioned for operation in "THIRD" or "DIRECT" drive gear. The position of the valve spool 112 at this time is shown in FIG. 6.

With valve spool 112 in its "DIRECT" position, regulator valve 102 continues to function to maintain line pressure at approximately 90 p.s.i. and the fluid passing through coupling A continues to be circulated and cooled. The pressurized fluid supplied to the interior of valve 100 through line 130 passes through line 38 to engage clutch $C_1$ and through line 167 to front clutch $C_2$ where it acts in pressure chamber 67 to force piston 68 outwardly and engage clutch $C_2$. The rate of fluid flow through line 167 is controlled by an orifice plate 172 which acts to cushion the application of clutch $C_2$. Line 167 also includes an auxiliary portion 167a by-passing orifice plate 172 to allow relatively rapid flow of discharge fluid out of clutch $C_2$ when the latter is deactuated. A check valve 174 precludes flow of fluid through portion 167a during application of clutch $C_2$. Fluid is also supplied at this time to servo 110 through line 162; servo 110 is not actuated however since pressure fluid is also delivered at this time into upper pressure chamber 176 through line 167b where it acts against the relatively large area of the upper face of piston 164 to overcome the force of the pressure fluid acting in lower chamber 163 against the relatively small annular area of piston shoulder 164a. Servo 108 is also not actuated at this time since the lower end of line 150 is vented to sump 26'.

Simultaneous engagement of clutches $C_2$ and $C_1$ connects the ring gear 64 and the sun gear 61 of the planetary gear set 60; this locks up the gear set 60 for the transmission of a direct 1:1 forward drive. Locking up gear set 60 also locks up gear set 50 because of the interconnection between the several elements of these two gear sets.

When gear selector lever 124 is moved to a position to dispose pointer 128 opposite the indicium "N" on quadrant 126, the transmission is placed in "NEUTRAL." The position of spool 112 at this time is shown in FIG. 7.

With spool 112 in its "NEUTRAL" position, regulator valve 102 continues to function to maintain line pressure at 90 p.s.i. and cooling fluid continues to be circulated through fluid coupling A. Lines 38, 150 are vented to sump 26' so that clutch $C_1$ and servo 108 are not actuated. Pressure fluid is delivered to line 167 but does not reach clutch $C_2$ since pressure fluid in line 178 acting against spool 180 of auxiliary valve 106 moves that spool to the right into a position in which land portion 180a forms a block in line 167. Clutch $C_2$ is accordingly not actuated.

Pressure fluid does flow through line 162 to actuate servo 110 and thereby clamp brake band $B_2$ on drum 89; engagement of drum 89 has no effect on output shaft 81, however, since both clutches are disengaged at this time.

When gear selector lever 124 is moved to a position to dispose pointer 128 opposite the indicium "R" on quadrant 126, the transmission is conditioned for operation in "REVERSE" gear. The position of valve spool 112 at this time is shown in FIG. 8.

With valve spool 112 in its "REVERSE" position, line 130 is cut off from line 132 by a land portion of spool 112 so that the fluid from line 138 acting against annular spool face 134b must act alone to overcome spring 136. Valve 102 thus functions to maintain the line pressure at a higher value (e.g. 260 p.s.i.) than was maintained during operation in any of the forward speeds and in neutral.

The fluid delivered to the interior of valve 100 through line 130 passes through line 150b and line 150 to actuate servo 108 and through line 167c to actuate clutch $C_2$. Line 167b delivers fluid to upper chamber 176 of servo 110 to overcome the upward pressure of the fluid delivered to lower chamber 163 and prevent actuation of servo 110. Line 38 is vented to sump 26' so that clutch $C_1$ is also not actuated.

With clutch $C_1$ disengaged there is no drive input to the ring gear 64. Drive input is from the input shaft 18 through the clutch $C_2$ and drum 192 to the sun gear 51. Since braking band $B_1$ is applied, the carrier 53 is anchored and the output shaft mounted ring gear 54 is driven in a backwards or reverse direction by the gear set 50. Planetary 50 is thus effective to transmit the "REVERSE" drive.

When gear selector lever 124 is moved to a position to dispose pointer 128 opposite the indicium "P" on quadrant 126, the transmission is placed in "PARK." The position of spool 112 at this time is shown in FIG. 9.

With spool 112 in its "PARK" position, fluid bleeds between reduced diameter valve land portion 112a and valve body rib 100a so that regulator valve 102 functions to maintain line pressure at a value substantially lower (e.g. 30–50 p.s.i.) than with the transmission in any of its forward speeds or in neutral. Cooling fluid continues to be circulated through fluid coupling A. Lines 38, 150, 162, and 167 are all vented to sump 26' at this time so that clutches $C_1$ and $C_2$ and servos 108 and 110 are all deactuated. As control plate is pivoted into position to dispose pointer 128 opposite "P," means such as a cable 182 secured to plate arm 118 act to pull a sprag (not shown) into a position of interlocking engagement with sprag gear 185 on output shaft 81, whereby to lock up the rear wheels and preclude movement of the vehicle.

It will be seen that the transmission of the invention enables the operator to positively select any of the three forward speeds at any vehicle speed so that the operator at all times maintains complete control over the gear ratio being transmitted. Shifting with the semi-automatic transmission of the invention is smooth and positive and may be accomplished without letting up on the accelerator pedal.

Further, because of the interchangeability of parts between the transmission of the invention and conventional fully automatic transmissions, and because of the ability to utilize existing automatic transmission production and assembly facilities, it has been found that the semi-automatic transmission of the invention can be produced at a cost comparable to, or less than, the cost of a completely manual transmission.

While a preferred embodiment of the invention has been illustrated and described in detail, it is to be understood that various changes may be made in the disclosed embodiment without departing from the scope or spirit of the invention as defined by the appended claims.

We claim:
1. A transmission for a motor vehicle adapted to receive the power output of the engine of said vehicle and selectively transmit the engine output to the driving wheels of the vehicle, said transmission including:
   (A) an input shaft;
   (B) means, including a fluid coupling, connecting said input shaft to the output of said engine and operative to drive said input shaft from said engine without torque conversion;
   (C) an output shaft for connection to said driving wheels;
   (D) a gear train selectively interconnecting said shafts and including a plurality of gears having at least two combining patterns effective to respectively provide at least two drive ratios between said input and said output shafts;
   (E) power clutch means operative when actuated to selectively shift said gears between said at least two combining patterns; and
   (F) control means, including a gear selector member accessible to an operator of said motor vehicle and having at least two positions, operative irrespective of vehicle speed in response to movement of said selector member between said at least two positions to selectively actuate said power clutch means to selectively and positively shift said gears between said at least two combining patterns.

2. A transmission for a motor vehicle adapted to receive the power output of the engine of said vehicle and selectively transmit the engine output to the driving wheels of the vehicle, said transmission including:
   (A) an input shaft;
   (B) means driving said input shaft from said engine without torque conversion;
   (C) an output shaft for connection to said driving wheels;
   (D) a gear train selectively interconnecting said shafts and including a plurality of planetary gear sets having at least two combining patterns effective to respectively provide at least two drive ratios between said input and said output shafts;
   (E) power clutch means operative when actuated to selectively shift said planetary gear sets between said at least two combining patterns; and
   (F) control means, including a gear selector member accessible to an operator of said motor vehicle and having at least two positions, operative irrespective of vehicle speed in response to movement of said selector member between said at least two positions to selectively actuate said power clutch means to selectively and positively shift said planetary gear sets between said at least two combining patterns.

References Cited

UNITED STATES PATENTS

| | | | |
|---|---|---|---|
| 2,433,052 | 12/1947 | Kelley | 74—189.5 |
| 2,788,678 | 4/1957 | Sheppard | 74—645 |
| 3,053,115 | 9/1962 | Cartwright | 74—763 X |
| 3,149,498 | 9/1964 | Mack | 74—331 X |
| 3,175,411 | 3/1965 | McFarland | 74—330 |
| 3,354,739 | 11/1967 | Ivanchich | 74—331 X |

ARTHUR T. McKEON, *Primary Examiner.*